Sept. 1, 1970 W. S. BUSLIK ET AL 3,526,884

DUSTPROOF MAGNETIC DISCS HOUSING

Filed April 26, 1965 2 Sheets-Sheet 1

INVENTORS.
WALTER S. BUSLIK
MARSHALL E. FREEMAN

BY *Robert B. Crouch*
ATTORNEY 3,526,884
DUSTPROOF MAGNETIC DISCS HOUSING
Walter S. Buslik and Marshall E. Freeman, San Jose, Calif., assignors to International Business Machines Corporation, Armonk, N.Y., a corporation of New York
Filed Apr. 26, 1965, Ser. No. 450,783
The portion of the term of the patent subsequent to Nov. 1, 1986, has been disclaimed
Int. Cl. G11b *11/02, 17/26, 23/04*
U.S. Cl. 340—174.1 7 Claims

ABSTRACT OF THE DISCLOSURE

An interchangeable, random access disk cartridge contains a magnetic recording disk, which is assembled to a disk drive unit. The cartridge can be oriented only in one direction relative to the drive unit, and has two doors for head access and air entry, which are automatically opened when the cartridge is inserted into the drive.

The present invention relates to an interchangeable random access memory component with off-line storage capability and more particularly to a magnetic coated memory which is permanently enclosed in a dust-proof, portable cartridge.

Random access memories with off-line storage capability are presently known in the data processing field. Such memories usually employ an assembly of one or more magnetic coated disks which are adapted to be mounted on a drive unit for recording data on the surfaces of the disks and then reading and updating such data as desired. To facilitate handling and storage of the disk assembly and to protect the disk surfaces during installation on, and removal from, the drive unit, an enclosure or cover is provided for the assembly. The enclosure prevents human contact with the disk surfaces and seals the disks from airborne contaminants of various types, while allowing the necessary connections to be made with the drive unit. This includes introducing one or more transducers into close proximity with the disk surfaces and engaging the disk assembly with a drive motor for rotation of the disk surfaces past the transducer. Up to now, the disk assembly has generally been protected by providing a removable cover which is detached when the assembly is engaged by the drive unit. It is also known to journal the disk assembly in a permanent receptacle or housing, access for the transducer being obtained through a trap door in the receptacle and engagement with the drive motor by means of a clutch plate on the exterior of the receptacle.

An object of the present invention is to provide a simplified construction for a portable random access memory component which permits a disk assembly to be permanently retained within a cartridge without the use of bearings or exterior drive connections.

The above object is realized in the present invention by provision of a disk assembly which includes an annular recording disk and a central web section secured thereto. The web section is provided with a bore on its axis of rotation and an annular magnetizable portion spaced radially therefrom. A generally cylindrical cartridge is provided with an enlarged central opening in its lower surface and an access door extending over a small portion of its circumference. The disk assembly is contained within the cartridge with the web section positioned within the central opening. Means is provided for spring biasing the web secton against the lower surface of the cartridge for off-line storage. When the cartridge is mounted on a drive unit the access door is automatically opened and the bias pressure relieved, thus freeing the disk assembly for rotation within the cartridge and allowing insertion of a transducer assembly.

The foregoing and other objects, features and advantages of the invention will be apparent from the following more particular description of a preferred embodiment of the invention, as illustrated in the accompanying drawings.

Figure 1:
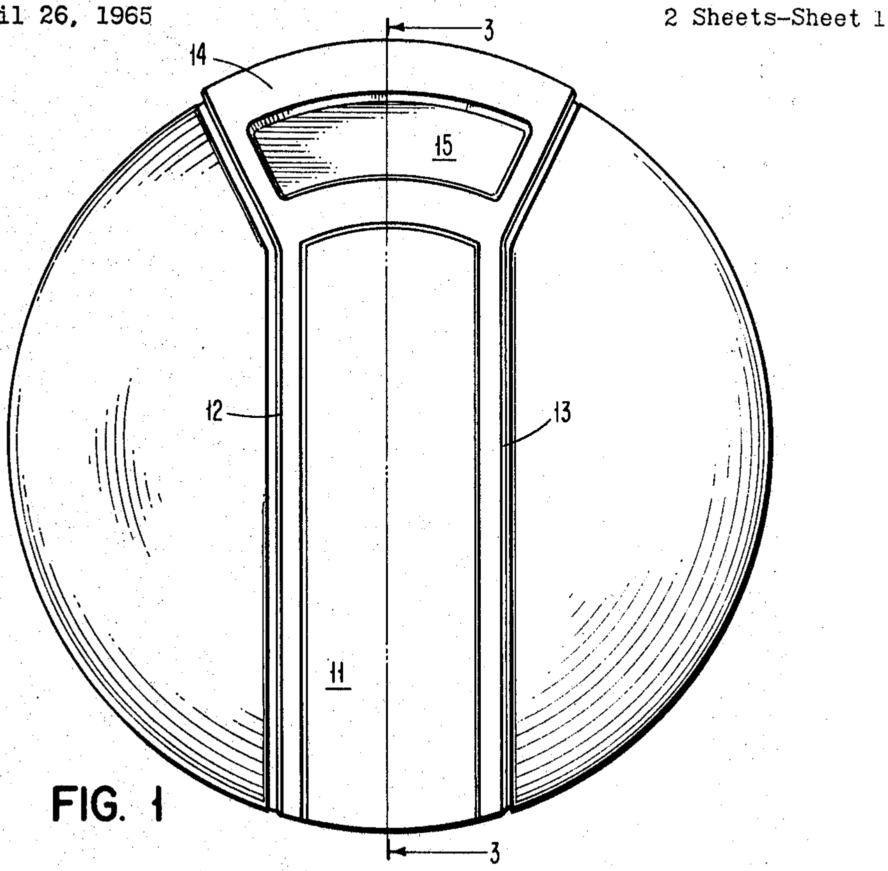
FIG. 1 is a top view of the exterior of the cartridge of the present invention.

As illustrated in FIG. 1, the cartridge 11 of the present invention is of generally cylindrical construction with a diametrically extending raised portion on its top surface. The raised portion is provded with parallel sides 12 and 13 which merge into a hand grip 14 along one edge of the cartridge. The hand grip is defined by the sides of the raised portion, the edge of the cartridge and a finger recess 15. The lower surface (FIG. 2) is provided with a similar finger recess 16 and an enlarged central opening 17.

Figure 3:
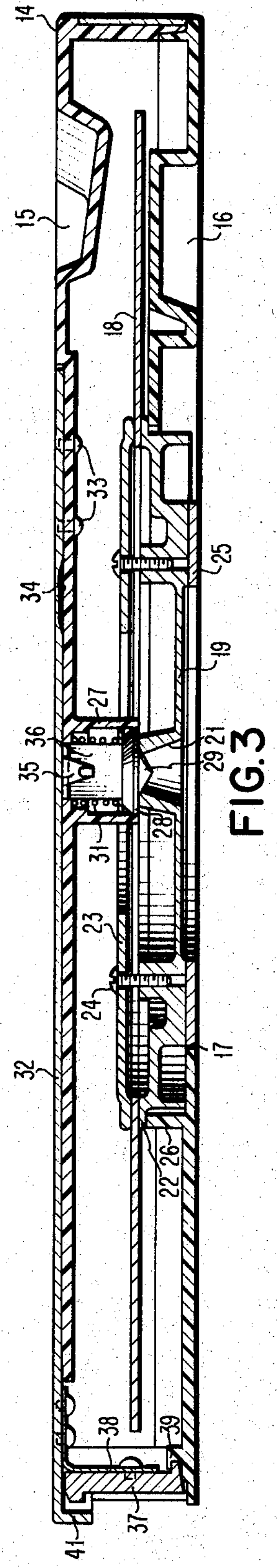
FIG. 3 is a sectional view at an enlarged scale taken along lines 3—3 of FIG. 1.

As shown in FIG. 3, the disk assembly includes an annular disk 18 having a magnetizable coating such as ferric oxide, nickel-cobalt, etc. on its upper and lower surfaces. A central web section 19 is provided with an inwardly tapered bore 21 located on the axis of rotation of the disk assembly. A radially extending flange 22 on the web section bears against the lower surface of the disk adjacent its inner edge and is firmly clamped thereto by means of a clamping ring 23 and screws 24. The web, which may be of any light, strong material such as aluminum, etc., is further provided with an annular section 25 of magnetizable material secured to its lower surface. The web section is supported on an annular flange 26 which protrudes inwardly from the lower surface of the cartridge adjacent the edge of central opening 17. The upper surface of the cartridge is provided with a biasing means in the form of an inwardly extending cylinder 27 in which is mounted a spring-loaded piston 28. The piston is provided with a tapered bearing surface 29 which engages the inner extremity of bore 21. The piston is biased away from the upper surface of the cartridge by means of a compression spring 31. A stiff leaf spring 32 is secured at one end to the raised portion of the cartridge adjacent finger recess 15, as by rivets 33. The leaf spring is provided with a reduced section 34 and is connected to piston 28 by links 35 and 36 which extend through the upper surface of the cartridge. An access door 37 is attached to the distal end of the leaf spring by means of a flexible angle section 38 which allows a limited degree of pivotal movement of the door relative to the leaf spring. A latch member 39 is provided at either side of the access opening adjacent the lower surface of the cartridge. The free extremity of the leaf spring is turned under to form a ledge 41 which overlies the upper edge of the access door.

In the off-line or storage condition of the cartridge as illustrated in FIG. 3, flange 22 of the central web section is biased against flange 26 on the lower surface of the cartridge by compression spring 31 acting through the bearing surface of piston 28 against the inner end of bore 21. In this condition, the disk assembly and the cartridge act as a single unitary structure, since there is no relative movement between the two. In the off-line condition, the cartridge can be handled and stored without any human contact with the recording surfaces of the disk. In addition, the disk is protected from damage due to careless handling by means of the cartridge itself. Since the disk assembly is restrained in the position of FIG. 3 the disk surfaces do not contact the inner surfaces of the cartridge and any shock received by the cartridge will be transmitted to the central web section, rather than to the disk itself. The interior of the cartridge is sealed against airborne contaminants since the various openings to the cartridge are closed: opening 17 is sealed by the web section bearing against flange 26; the opening within cylinder 27 is sealed by the piston 28 and leaf spring 32; and the transducer access opening is sealed by door 27. The access door 37 is locked in its closed position by latch members 39 which overlap the inturned lower edge of the door. The construction of the door and leaf spring prevent careless or accidental opening of the door, since ledge 41 overlies and protects the upper edge of the door. This prevents the inadvertent or careless application of pressure against the upper edge of the door to release the latch.

Figure 2:
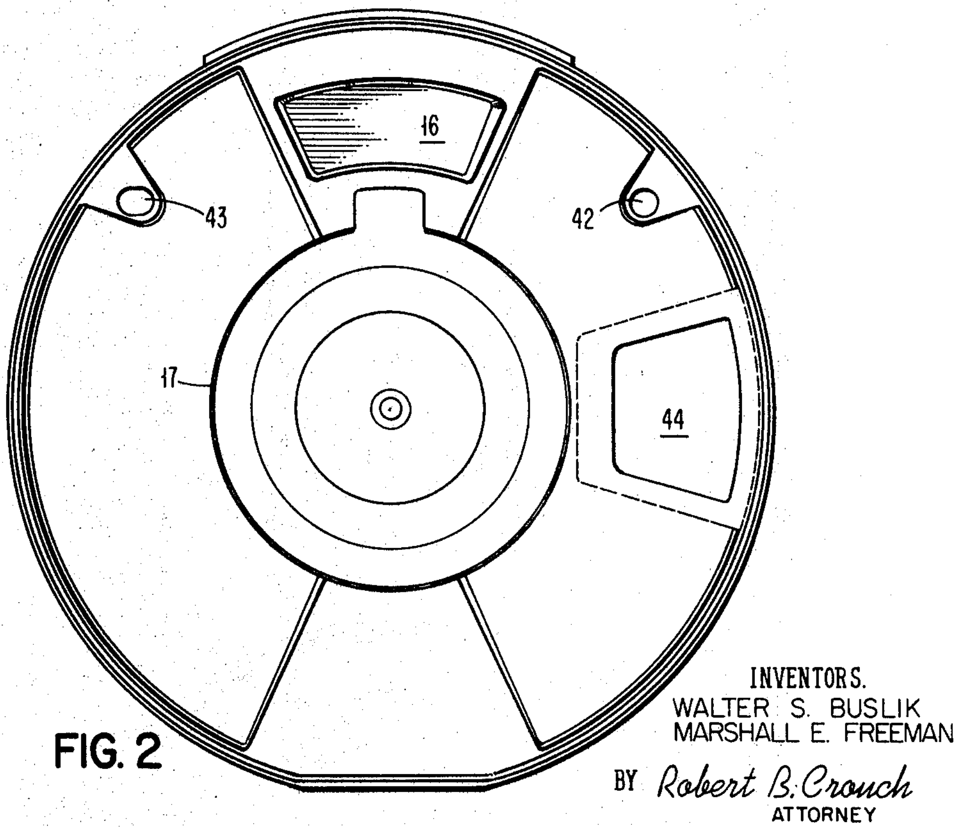
FIG. 2 is a bottom view of the cartridge of FIG. 1.
Figures 4, 5:
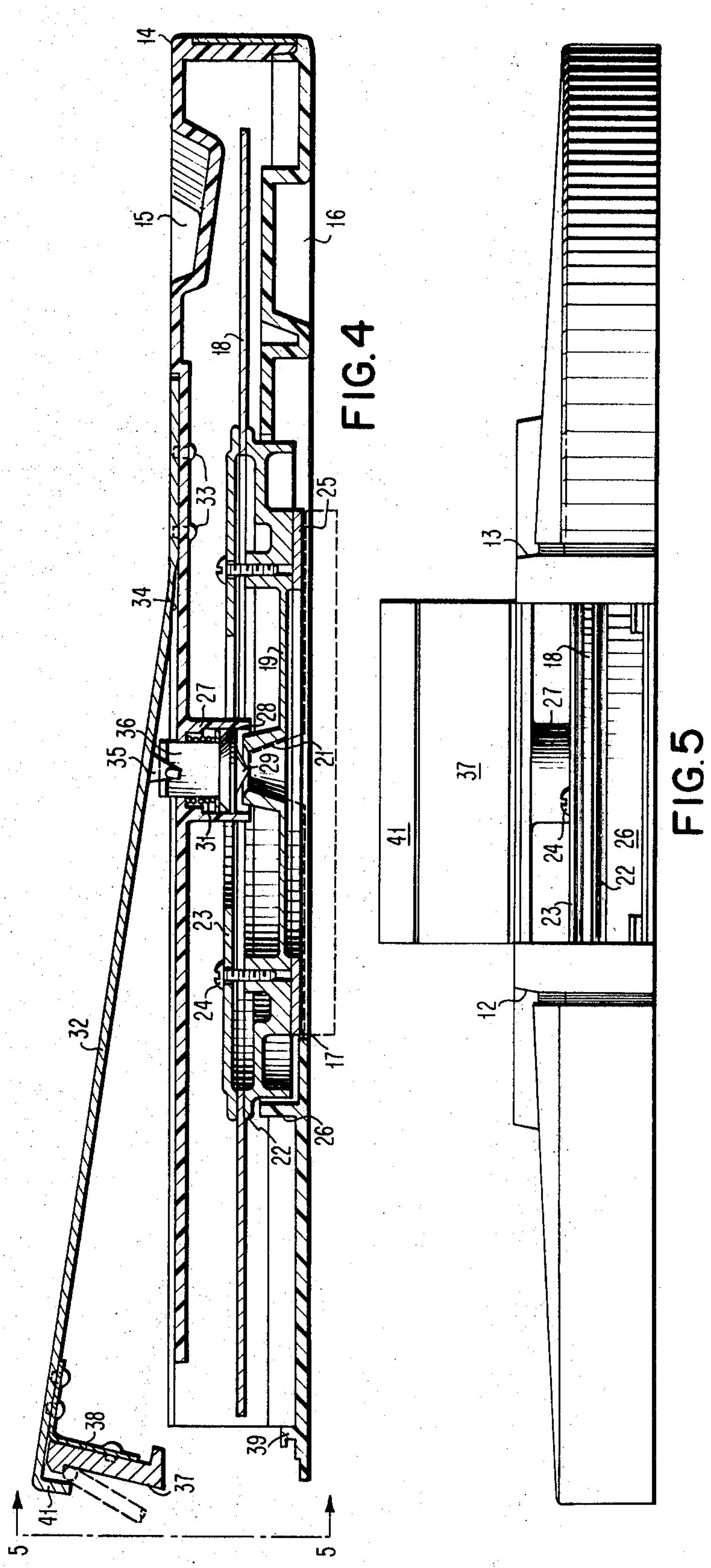
FIG. 4 is a cross-sectional view similar to FIG. 3 showing the access door in its open position.
FIG. 5 is an elevation view taken along lines 5—5 of FIG. 4.

When the cartridge of the present invention is placed on the drive unit, it is inserted in a receiver slot which includes spaced guide surfaces adapted to bear against the opposite sides 12 and 13 of the raised portion on the upper surface of the cartridge. These guides orient the cartridge and align the access door with the transducer assembly on the drive unit. The hand grip 14, being the wider part of the raised portion, prevents the cartridge from being inserted backwards. As the cartridge is inserted into the receiver slot, a pivoted lever, shown in dotted lines at the left of FIG. 4, contacts the upper edge of the access door 37 causing the door to pivot clockwise and release the lower inturned edge of the door from the latch members 39. Continued movement of the cartridge causes the lever to pivot in a counter-clockwise direction, thus lifting the access door and leaf spring 32 to the position shown in FIG. 4. The leaf spring pivots about the reduced section 34 and raises piston 28, through links 35 and 36, away from bore 21 of the central web section. The cartridge is then pivoted a slight amount in a clockwise direction, so that the lower surface of the cartridge bears against the drive unit. In this position, the plane of the cartridge is determined by three points on the drive unit, i.e., a guide surface which bears against the lower surface of the cartridge adjacent the access doorway, and two shouldered pegs which are received within openings 42 and 43 (FIG. 2). Location of the cartridge within the plane is accomplished by the two shouldered pegs fitting into a round hole 42 and an elongated hole 43. As the cartridge is pivoted, the central web section is brought into contact with the spindled drive chuck shown in dotted lines in FIG. 4. The spindle is received within tapered bore 21 while the chuck engages the annular section 25 on the lower surface of the web. The plane of the disk assembly is determined by the spindled chuck which is slightly elevated from the guide surface and shouldered pegs of the drive unit. The disk assembly is thus lifted free of flange 26 and may then be rotated within the cartridge by the spindled chuck. When the cartridge is in position on the drive unit, a flapper valve 44 (FIG. 2) in the lower surface of the cartridge is depressed inwardly by a peg on the drive unit. Filtered air is then supplied to the interior of the cartridge where it is circulated and discharged through the access opening.

While the invention has been particularly shown and described with reference to a preferred embodiment thereof, it will be understood by those skilled in the art that the foregoing and other changes in the form and details may be made therein without departing from the spirit and scope of the invention.

What we claim is:

1. An interchangeable, random access, magnetic memory component which is adapted to be installed on a memory drive unit, comprising:
- a generally cylindrical dust-proof cartridge which includes spaced upper and lower surfaces, said cartridge including an access door in its periphery;
- a magnetic disk assembly positioned within the cartridge;
- means for positioning said memory component relative to said drive unit upon installation;
- means within the cartridge to prevent rotation movement between the disk assembly and the cartridge whenever the cartridge is detached from the drive unit and means for opening said access door when said cartridge is inserted into said drive unit and for simultaneously overcoming said rotation preventing means so that said disc assembly is permitted to rotate relative to said cartridge.

2. An interchangeable, random access, magnetic memory component as defined in claim 1 which includes:
- means for permitting driving engagement between the disk assembly and the drive unit when the cartridge is installed.

3. An interchangeable, random access, magnetic memory component as defined in claim 2 wherein:
- said last named means includes an enlarged central opening in one surface of the cartridge which exposes a portion of the disk assembly for driving engagement with a driven chuck on the drive unit.

4. An interchangeable, random access, magnetic memory component which is adapted to be installed on a memory drive unit, comprising:
- a generally cylindrical dust-proof cartridge which includes spaced upper and lower surfaces, said cartridge including an access door in its periphery;
- a magnetic disk assembly positioned within the cartridge, the assembly including at least one annular magnetic recording disk and a central web section secured to the disk;
- means for positioning said memory component relative to said drive unit upon installation;
- means within the cartridge for biasing the disk assembly against one surface of the cartridge whenever it is detached from the drive unit; and
- means for opening said access door when said cartridge is inserted into said drive unit and for simultaneously overcoming said disk assembly biasing means so that said disk assembly is permitted to rotate relative to said cartridge.

5. An interchangeable, random access, magnetic memory component which is adapted to be installed on a memory drive unit comprising:
- a generally cylindrical dust-proof cartridge which includes spaced upper and lower surfaces;
- a magnetic disk assembly positioned within the cartridge, the assembly including at least one annular magnetic recording disk and a central web section secured to the disk;
- means for positioning said memory component relative to said drive unit upon installation;
- first means within the cartridge for biasing the disk assembly against one surface of the cartridge whenever it is detached from the drive unit, said first means including a generally cylindrical, inwardly projecting flange on the lower surface and a spring-loaded piston mounted on an upper surface; and second means for overcoming the first means and permitting rotational freedom of the disk assembly within the cartridge when it is installed on the drive unit, said second means including a leaf spring mounted on the upper surface for retracting the spring-loaded piston and allowing access to the interior of the cartridge when the cartridge is installed on the drive unit.

6. An interchangeable, random access, magnetic memory component as defined in claim 5 which includes:

an enlarged central opening in the lower surface of the cartridge which exposes the central web section of the disk assembly for driving engagement with a driven chuck on the drive unit.

7. An interchangeable, random access magnetic disk assembly for installation on a drive unit comprising:

a cylindrical cartridge having a central opening in its lower surface, and an access door in its periphery;

a recording disk having a web section attached thereto, said web section being positioned within said central opening;

means for spring biasing said web section against said cartridge when said disk assembly is not installed in said drive unit; and means for opening said access door when said cartridge is inserted into said drive unit, and for simultaneously relieving said spring biasing means so that said recording disk is free to rotate with said drive unit.

References Cited

UNITED STATES PATENTS

| | | | |
|---|---|---|---|
| 3,352,967 | 11/1967 | Gonmori | 179—100.2 |
| 466,166 | 12/1891 | Hahn | 346—137 |
| 3,176,281 | 3/1965 | Pattison | 340—174.1 |
| 3,304,544 | 2/1967 | Johnson et al. | 340—174.1 |

TERRELL W. FEARS, Primary Examiner

V. P. CANNEY, Assistant Examiner

U.S. Cl. X.R.

179—100.2; 274—41.4